Dec. 18, 1928.
S. SCHREIBER
DIRECTION SIGNAL
Filed Feb. 29, 1928
1,695,349
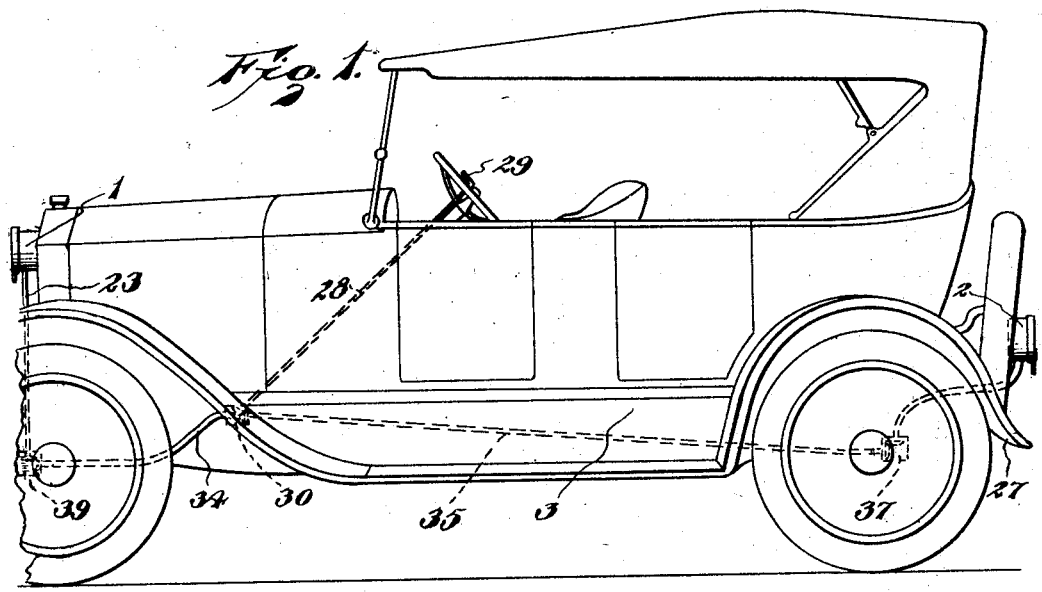
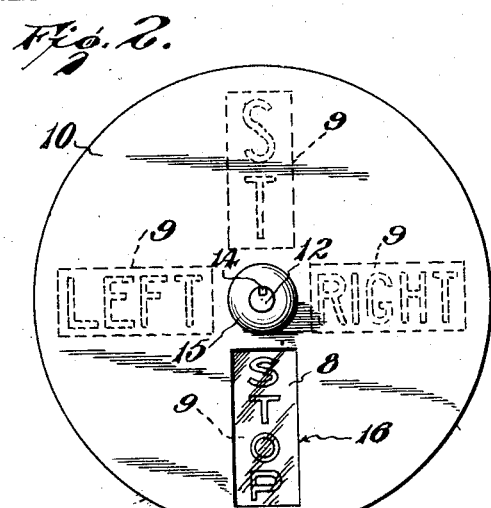
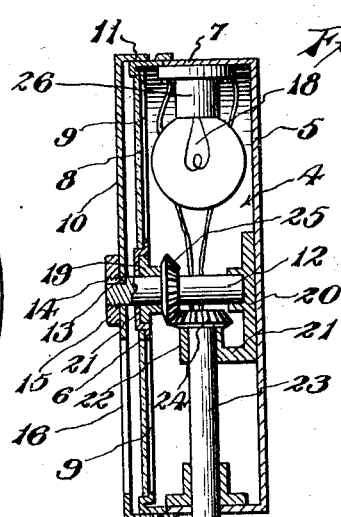
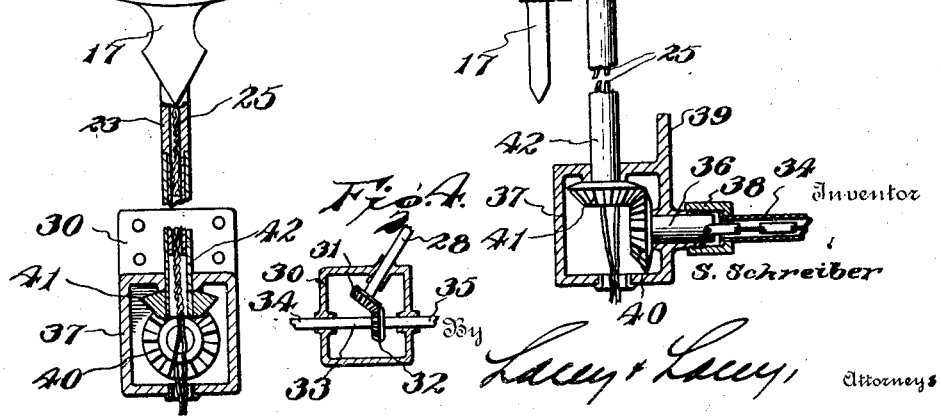
Inventor
S. Schreiber
By Lacey & Lacey
Attorneys Patented Dec. 18, 1928.

1,695,349

UNITED STATES PATENT OFFICE.

SIGMOND SCHREIBER, OF PITTSBURGH, PENNSYLVANIA.

DIRECTION SIGNAL.

Application filed February 29, 1928. Serial No. 257,974.

This invention relates to automobile accessories and more particularly to a direction signal adapted to be applied to an automobile and by means of which the driver may indicate his intentions to the driver of an automobile to the rear or in front of him.

One object of the invention is to provide an indicator of this character having indicators to be applied at the front and back of an automobile and operating means for the indicators including a rotatable actuating shaft to extend longitudinally of the steering post and other shafts leading from the actuating shaft to the indicators.

Another object of the invention is to so construct the actuating means that the indicators will be simultaneously operated and the intentions of the driver of the automobile communicated to the driver of another automobile or a pedestrian either in back or in front of the automobile.

Another object of the invention is to prevent the mechanism of the direction signal from being damaged by vibrations while traveling over rough roads.

Another object of the invention is to provide each indicator with an improved type of hood which is rotatably mounted so that it may be turned to disclose a selected signal illuminated by a light within a housing forming part of the indicator and also to provide the hood with an arrow-shaped extension which will point in the direction in which a turn is to be made and more clearly indicate an intention to turn when the indicator is not illuminated.

The invention is illustrated in the accompanying drawing, wherein

Figure 1 is a view in side elevation showing the direction signal in full lines applied to an automobile of a conventional construction indicated by dotted lines;

Fig. 2 is an enlarged view of one of the indicators showing the same partially in elevation and partially in vertical section;

Fig. 3 is a vertical sectional view through the indicator taken at right angles to the view shown in Fig. 2, and Fig. 4 is a fragmentary sectional view showing the connection between the actuating shaft and the shafts leading therefrom beneath the automobile body.

The indicators 1 and 2, which are applied at the front and back of an automobile designated in general by the numeral 3 and indicated by dotted lines in Fig. 1, are of a duplicate construction. Each indicator includes a housing or casing 4 which is circular in shape and provided with an inner end wall 5, an outer end wall 6 and a marginal wall 7 connecting the inner and outer walls. The outer end wall is offset inwardly, as shown in Fig. 3, to provide an outer annular recess or pocket in which a transparent sheet 8 is secured in any desired manner and slots 9 which are formed in the outer wall are covered by the transparent plate. The transparent plate may be left clear or the portions extending across the slots may be tinted different colors and these portions of the closure plate will be marked, as shown in Fig. 2, to indicate left and right turns and stop and straight. It will be obvious that, if desired, the portion marked "Straight" could be marked "Back" to indicate that the automobile is to move rearwardly. It will also be obvious that additional openings could be provided in the outer wall and appropriately marked.

In order to cover the outer wall of the casing and permit a selected signal to be displayed, I employ a hood or cap 10 which may be formed of metal and is provided with a marginal wall 11 which fits snugly about the marginal wall 7 of the casing but is permitted to turn freely thereon. This hood is formed with a central opening through which extends the outer end of a shaft 12 and the hood is keyed or otherwise secured upon the shaft so that the shaft may not turn without the hood being turned with it. In the present illustration, the hood is formed with a tongue 13 received in a slot 14 formed in the shaft and a securing nut 15 is threaded upon the outer end of the shaft. An opening 16 is formed radially in the hood and is of such dimensions that it may register with the openings 9 as the hood is rotated. Therefore, the legends painted or otherwise provided upon the transparent plate may be disclosed through the opening 16. Since the hood is formed with only one opening, all of the legends, except the one about which the opening 16 is disposed, will be hidden from view. An arm 17 shaped like an arrow head projects radially from the marginal wall of the hood in alinement with the opening 16 to attract attention and more clearly indicate the direction in which a turn is to be made during the daytime when the electrically energized bulb 18 is not illuminated. It will be obvious that the bulb may be illuminated at all times if so desired.

The shaft 12 upon which the hood is mounted is disposed axially of the casing and rotatably mounted in bearings 19 and 20. The bearing 19 is firmly secured in an internal pocket or recess formed in the hub portion 21 of the outer end wall and the bearing 20 is secured against the inner face of the wall 5. This bearing 20 is formed with an arm 21 which projects from its lower end and terminates in a vertically disposed bearing sleeve 22 to receive the upper end of a shaft 23 having a beveled gear 24 at its upper end which meshes with a beveled gear 25 fast upon the shaft 12. It will thus be seen that, when the shaft 23 is rotated, rotary motion will be imparted to the shaft 12 and the hood turned to such a position that all of the legends will be hidden from view or a selected one displayed. The shaft 23 at the front of the automobile is hollow and forms a conduit through which power wires 25, which lead from the socket 26 of the electric bulb are passed. The indicator at the rear of the automobile is also provided with a shaft 23 which may be hollow or solid but this shaft is shorter than the shaft of the indicator at the front of the automobile and is suitably engaged with a flexible shaft 27.

The actuating rod or shaft 28 extends longitudinally of the steering post of the automobile and at its upper end is bent to provide a turning handle 29 by means of which the actuating shaft may be easily rotated. This shaft or rod 28 extends downwardly through the bottom of the automobile body and has its lower end portion journaled in a gear housing 30 which is firmly secured through a cross bar forming part of the chassis of the automobile or to any other convenient portion of the chassis. A gear 31 is fixed upon the lower end of the rod 28 and meshes with a gear 32 carried by a shaft 33 journaled in the front and rear walls of the casing 30, as shown in Fig. 4. By referring to this figure, it will be seen that the shaft 33 projects forwardly and rearwardly from the gear housing and has its ends engaged with flexible shafts 34 and 35 which extend longitudinally beneath the automobile. Each of these shafts has its outer end connected with a shaft 36 which is journaled in a bearing formed in a side wall of a gear housing 37 and a coupling 38 is employed to firmly but releasably hold the sleeve or casing of the flexible shaft in engagement with the gear housing. The gear housing is formed with an attaching flange 39, by means of which it may be firmly secured to an axle of the automobile, as shown in Fig. 1. Within the gear housing the shaft 36 carries a gear or pinion 40 which meshes with a corresponding gear or pinion 41 fixed upon the inner end of a shaft 42 which projects upwardly from the gear housing and telescopes upon the lower end portion of the shaft 23 or is suitably engaged with the inner end portion of the flexible shaft 27. The shaft 23 has telescoping engagement with the shaft 42 so that the body portion and the axle of the automobile may have vertical movement relative to each other without bending or breaking these shafts.

When the driver of an automobile equipped with the improved signals is moving straight ahead along a road or street, the hood is turned to disclose the legend "Straight" which is at the top, as shown in Fig. 2. When the driver intends to turn, either to the left or right, the handle 29 is grasped and the shaft or rod 28 rotated a sufficient distance to cause the hood to be rotated a one quarter turn in the proper direction to disclose the legend "Left" or "Right" or if a stop is to be made the shaft will be rotated a sufficient distance to disclose the legend "Stop". After a turn has been made or when the automobile is to be again started, the actuating shaft will be rotated to return the hood to its initial position and again disclose the legend "Straight".

Having thus described the invention, I claim:

1. A vehicle direction indicator comprising a casing having an inner end wall, a marginal wall and an outer end wall, a shaft extending axially in the casing and projecting from the outer end wall thereof, bearings for said shaft in said casing against the inner faces of said end walls, one bearing having an arm extending beneath the shaft and formed with a bearing sleeve, a drive shaft extending into said casing through the marginal wall and journaled in the bearing sleeve, intermeshing gears carried by said shafts, direction indicating means carried by the outer end wall, and a hood for the outer end wall and indicating means carried by the outer end portion of the first-mentioned shaft and formed with a sight opening through which a selected portion of the indicating means may be disclosed by rotating the hood and shaft carrying the hood.

2. A vehicle direction indicator comprising a casing having an inner end wall, a marginal wall and an outer end wall, the outer end wall being shaped to define a central hub and an annular external seat about the hub, radially extending openings being formed in the seat forming portion of said outer end wall, a transparent disk seated in said seat and having direction indicating legends upon its portions covering the openings, a shaft extending axially in said casing and projecting outwardly through the hub portion of said outer end wall, a hood carried by the outer end portion of said shaft and disposed in shielding relation to the outer end wall and disk, said hood being formed with a sight opening, and means to transmit rotary motion to said shaft and turn the hood whereby a selected direction indicating legend may be displayed through the opening in the hood.

3. A vehicle direction indicator comprising a casing having an inner end wall, a marginal wall and an outer end wall, the outer end wall being shaped to define a central hub and an annular external seat about the hub, radially extending openings being formed in the seat forming portion of said outer end wall, a transparent disk seated in said seat and having direction indicating legends upon its portions covering the openings, a shaft extending axially in said casing and projecting outwardly through the hub portion of said outer end wall, bearings for said shaft, one secured against the inner surface of the inner end wall and the other fitting into the hub portion of the outer end wall, a hood removably secured upon the outer end portion of said shaft to turn therewith and disposed in shielding relation to the outer end wall and disk, said hood being formed with a sight opening, and means to transmit rotary motion to said shaft and turn the hood whereby a selected direction indicating legend may be displayed through the opening in the hood.

In testimony whereof I affix my signature.

SIGMOND SCHREIBER. [L. S.]